United States Patent
Uzoh et al.

(10) Patent No.: US 6,234,870 B1
(45) Date of Patent: May 22, 2001

(54) SERIAL INTELLIGENT ELECTRO-CHEMICAL-MECHANICAL WAFER PROCESSOR

(75) Inventors: Cyprian E. Uzoh, Milpitas, CA (US); Daniel C. Edelstein, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/382,109

(22) Filed: Aug. 24, 1999

(51) Int. Cl.[7] ................................................ B04B 1/00
(52) U.S. Cl. ................................ 451/8; 451/5; 451/41; 451/285; 451/287; 451/288; 451/289
(58) Field of Search ..................... 451/5, 8, 41, 285, 451/287, 288, 289

(56) References Cited

U.S. PATENT DOCUMENTS

| | | |
|---|---|---|
| 5,486,129 | 1/1996 | Sandhu et al. . |
| 5,637,031 | 6/1997 | Chen . |
| 5,643,044 | 7/1997 | Lund . |
| 5,643,060 | 7/1997 | Sandhu et al. . |
| 5,643,061 | 7/1997 | Jackson et al. . |
| 5,658,183 | 8/1997 | Sandhu et al. . |
| 5,658,185 | 8/1997 | Morgan, III et al. . |
| 5,690,540 | 11/1997 | Elliott et al. . |
| 5,695,601 | 12/1997 | Kodera et al. . |
| 5,700,180 | 12/1997 | Sandhu et al. . |
| 5,730,642 | * 3/1998 | Sandhu et al. ..................... 451/6 |
| 5,755,859 | 5/1998 | Brusic et al. . |
| 5,793,272 | 8/1998 | Burghartz et al. . |
| 5,807,165 | 9/1998 | Uzoh et al. . |
| 5,908,347 | * 6/1999 | Nakajima et al. .................. 451/5 |
| 5,911,619 | 6/1999 | Uzoh et al. . |
| 6,036,582 | * 3/2000 | Aizawa et al. ..................... 451/41 |
| 6,062,949 | * 5/2000 | Yashiki et al. .................... 451/10 |
| 6,110,008 | * 8/2000 | Fujita et al. ...................... 451/8 |

* cited by examiner

Primary Examiner—Joseph J. Hail, III
Assistant Examiner—Shantese McDonald
(74) Attorney, Agent, or Firm—Connolly, Bove, Lodge & Hutz; Joseph P. Abate, Esquire.

(57) ABSTRACT

An apparatus for removing material from a substrate including a plurality of polishing cells. A first polishing cell detects the material on the substrate and performs a first polishing operation for removing material from the substrate. The first polishing cell includes at least one sensor for characterizing the material on the substrate and at least one polishing tool for removing material from the substrate. A second polishing cell includes at least one polishing tool for completing the polishing process.

37 Claims, 6 Drawing Sheets

US 6,234,870 B1

SERIAL INTELLIGENT ELECTRO-CHEMICAL-MECHANICAL WAFER PROCESSOR

FIELD OF THE INVENTION

The invention relates to a device and method for removing material from a substrate. In particular, the invention relates to a method and apparatus for carrying out electrochemical and chemical mechanical polishing.

BACKGROUND OF THE INVENTION

In a variety of applications, particularly semiconductor device manufacture process, material needs to be removed from a substrate or other workpiece. First, material may be deposited on a substrate or workpiece. Portions of the material may then be removed. Sometimes, the material may be removed as part of the normal process. Other times, material may be removed because it is undesirably deposited in certain locations.

Along these lines, in damascene chip wiring methods, typically material is deposited over all surfaces on a substrate. A portion of the material is then removed by polishing to leave material in desired locations. Among the various processes involved in damascene chip wiring methods, apart from the photolithography step, the chemical mechanical polishing step is typically the next most expensive step.

Typical chemical mechanical polishing apparatuses have a low throughput. This contributes to the comparatively higher cost of chemical mechanical polishing.

SUMMARY OF THE INVENTION

The present invention provides an apparatus for removing material from a substrate. The apparatus includes a plurality of polishing cells. The polishing cells include a first polishing cell for detecting the material in a substrate and performing a first polishing operation for removing material from the substrate. The first polishing cell includes at least one sensor for characterizing the material in a substrate and at least one polishing tool for removing material from the substrate. A second polishing cell includes at least one polishing tool for completing the polishing process.

The present invention also provides a method of removing material from a substrate. The method includes arranging the substrate on an apparatus including a plurality of polishing cells. The polishing cells include a first polishing cell for detecting the material in a substrate and performing a first polishing operation for removing material from the substrate. The first polishing cell includes at least one sensor for characterizing the material in a substrate and at least one polishing tool for removing material from the substrate. A second polishing cell includes at least one polishing tool for completing the polishing process. The method also includes detecting the material on a substrate, performing a first polishing operation, and completing the polishing operation.

Furthermore, the present invention provides an apparatus for removing material from a substrate. The apparatus includes at least one polishing station comprising a plurality of elements for varying polishing process parameters.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned objects and advantages of the present invention will be more clearly understood when considered in conjunction with the accompanying drawings, in which:

FIG. 6b represents an view of a portion of the embodiment of the apparatus illustrated in FIG. 6a;

DETAILED DESCRIPTION OF THE INVENTION

Figures 1A, 1B:
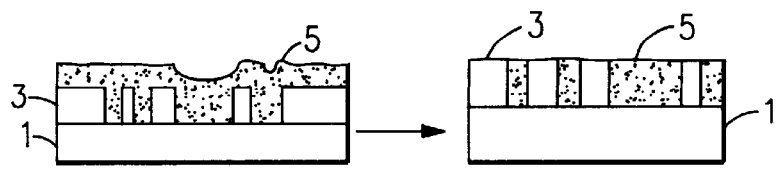
FIG. 1a represents a cross-sectional view of a damascene structure prior to chemical mechanical polishing.
FIG. 1b represents a cross-sectional view of the structure illustrated in FIG. 1a after chemical mechanical polishing.

FIG. 1a illustrates an example of a damascene structure. The structure in FIG. 1a includes a substrate 1. Dielectric material 3 typically has been deposited and patterned on the substrate 1. An electrically conductive material 5 typically is deposited in and on the dielectric layer 3. After depositing the electrically conductive material 5, the structure is subjected to chemical mechanical polishing to remove desired amounts of the electrically conductive material and to result in the structure illustrated in FIG. 1b.

Figure 2:
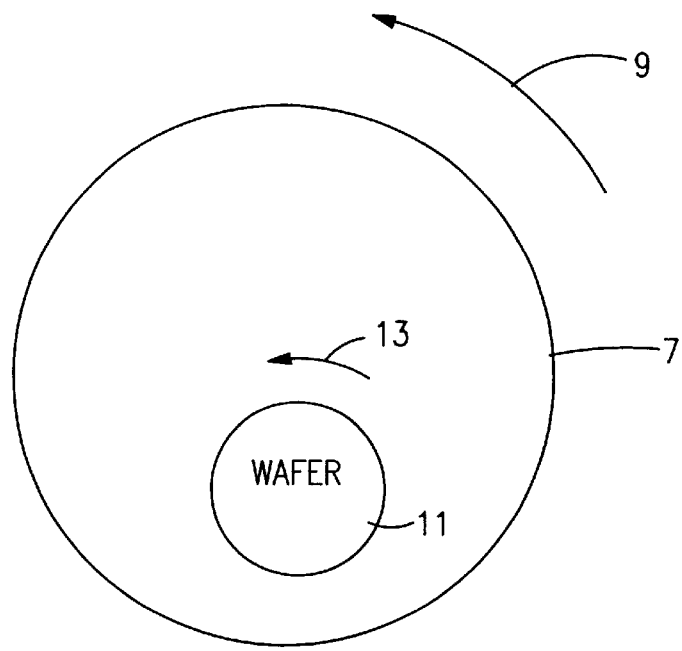
FIG. 2 represents an overhead view of a typical known single wafer chemical mechanical polishing apparatus.

FIG. 2 illustrates a typical single wafer polisher. The device illustrated in FIG. 2 includes a platen 7. A polishing pad is arranged on platen 7. The platen 7 may rotate as indicated by arrow 9.

Figure 3:
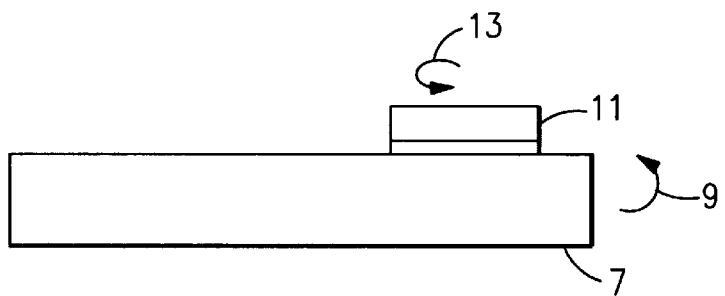
FIG. 3 represents a cross-sectional view of the apparatus illustrated in FIG. 2.

A wafer 11 may be arranged in a face down position such that the surface to be polished faces the platen 7. The wafer may also rotate as indicated by arrow 13. FIG. 3 illustrates a cross-sectional view of the arrangement of the platen and the wafer.

Typically, such single wafer polishers have a low throughput. This is at least in part due to their ability to process only one wafer at a time. Therefore, such polishers have a low throughput. A low throughput not only increases the cost of chemical mechanical polishing, but also increases the cost of chemical mechanical polishing.

Another drawback of such single wafer polishers is that they typically utilize the same pad for all polishing operations, regardless of the nature of the material being removed as well as the stage of material removal. Furthermore, such polishing apparatuses typically apply monolithic pressure. In other words, the polishing apparatus can only apply single pressure to a substrate as well as across all areas of the substrate.

Figure 4:
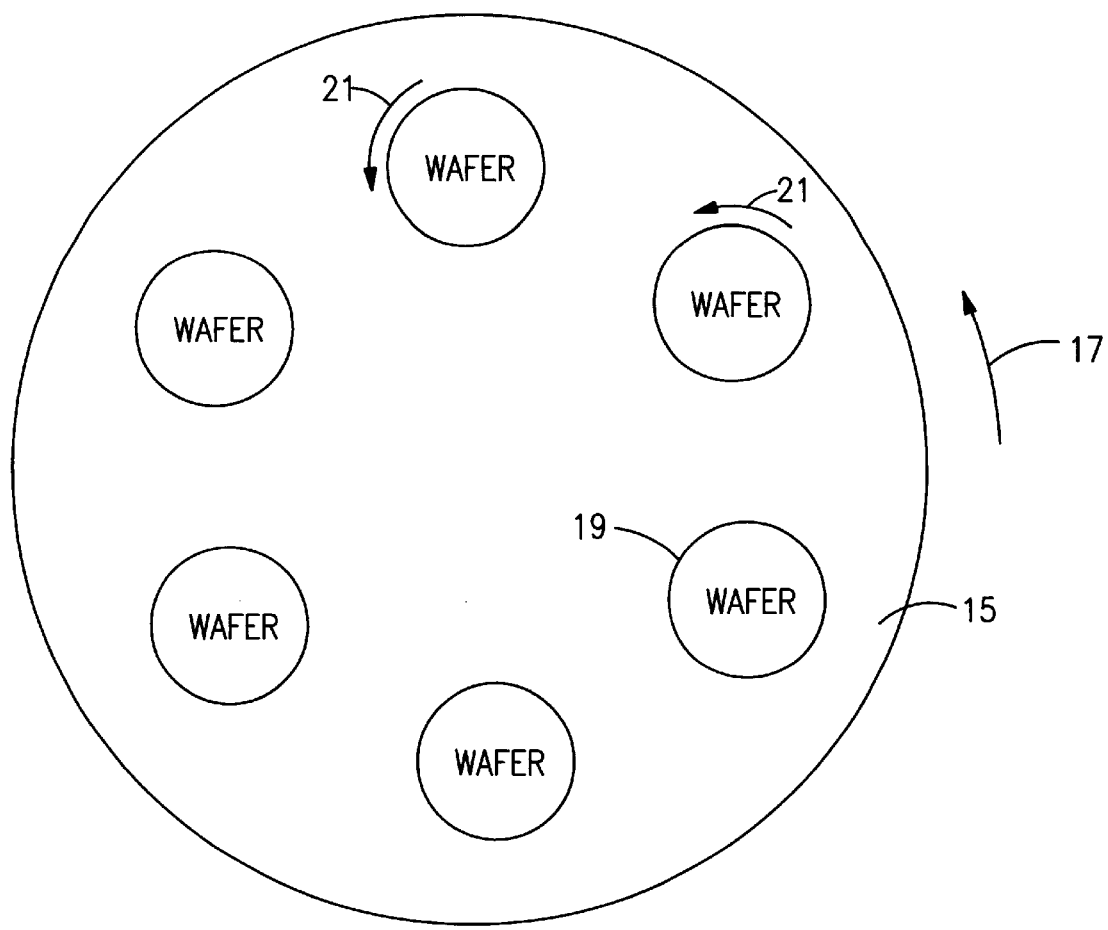
FIG. 4 represents an overhead view of a known design of a multi-wafer chemical mechanical polishing apparatus.

To address the shortcomings, with respect to low throughput, of the apparatus illustrated in FIGS. 2 and 3, multi-wafer polishers such as that illustrated in FIG. 4 have been developed. Such polishing apparatuses may increase throughput as compared to a single wafer polishing apparatus by a factor of about 3 to about 4 times. However, such apparatuses typically experience the disadvantages described above with respect to single wafer processing apparatus. Along these lines, multi wafer processing apparatuses also typically utilize the same pad for polishing all wafers as well as for all stages of polishing and apply monolithic pressure and suffer the drawbacks of these elements.

Also, with such multi-wafer processing apparatuses, losses can be high. For example, if one of the wafers breaks during polishing, it could damage the other wafers. Also, if there is a problem with the apparatus scratching a wafer, rather than effect one wafer as in the apparatus illustrated in FIGS. 2 and 3, all of the wafers on the apparatus illustrated in FIG. 4 would be damaged.

The apparatus illustrated in FIG. 4 includes a platen The platen may rotate as illustrated by arrow 17. A plurality of wafers 19 are arranged on the platen in a face down configuration. Each of the wafers may rotate as illustrated by arrows 21.

Other disadvantages of the apparatus as illustrated in FIGS. 2–4 include that they typically utilize the same rotational speed of the pad and/or the substrate during the entire polishing process. Typically, such apparatuses exert about 5 pounds per square inch pressure on a substrate. Typically, the wafer rotates about 75 RPM, while the platen rotates at about 50 RPM.

As stated above, these apparatuses typically utilize the same pad for all aspects of the polishing operation. Additionally, these apparatuses also typically utilize a single slurry during the entire processing operation. By utilizing the same pad, slurry, rotational speed, and other parameters, such apparatuses can do little to accommodate changing conditions as the polishing process proceeds.

A further problem with the apparatuses illustrated in FIGS. 2–4 relates to dishing of large features. Dishing may be exacerbated by the features and operation of these apparatuses. For example, utilizing the same processing parameters from beginning to end of polishing may increase dishing.

With the advent of aluminum and copper trench and via filling technology, the chemical mechanical polishing (CMP) steps have become one of the most critical steps in chip fabrication. This is because of the effect of CMP on opens and shorts yield.

In addition to the impact of CMP on yield, CMP is one of the most expensive steps at least partially on account of the low throughput of the CMP process. For example, the throughput for an M1 metal level may not be more than 6 wafers per hour. At higher metal levels such as a "fat wire level", where the thickness of deposited metal could be about 2.5 to about 3 microns, the throughput of CMP may not exceed more than about 3 wafers per hour. Low throughput is one factor responsible for the high cost of ownership of the CMP step. As a result, there is a need to reduce the cost of CMP.

The present invention provides solutions to the above described as well as other problems by providing an apparatus for electro-chemical-mechanical polishing. The apparatus includes at least one polishing cell including a plurality of elements for varying polishing process parameters. The present invention helps to increase the throughput of chemical mechanical polishing tools thereby reducing the cost of the chemical mechanical polishing process. The present invention may also include a plurality of polishing cells including a first polishing cell for beginning a polishing process and a second polishing cell for completing the polishing process.

Advantages of the present invention can include higher throughput as compared to known CMP and/or electro-chemical processors. Also, the throughput may be independent of the thickness of the material being removed. In particular, the present invention can increase throughput as compared to known chemical mechanical polishing apparatuses by a factor of about 3 to about 10 times.

The present invention provides greatly increased flexibility by tailoring the polishing process and apparatus to a particular application. Among the flexible aspects of the apparatus of the present invention are dynamic pressure application, multiple and variable polishing pads, including pad size, dynamic slurry formulation from aggressive to mild, edge deplating, particle cleaning, such as in a recycling loop and rework rotate to enhance yield.

In particular, the present invention can adapt to the characteristics of the material being removed to result in a custom polishing of each individual substrate. This is particularly important where there is poor uniformity of deposited material. Along these lines, the present invention can include multiple polishing pads. The polishing pads can have different characteristics to conform to the desired material removal. By utilizes different polishing heads with different polishing pads the present invention can optimize polishing rates.

Also along these lines, the present invention may include a dynamic slurry formulator for formulating various slurry compositions to customize the slurry to a particular application. To help accomplish this, the present invention can in situ mix slurries with oxygen and nitrogen injection to control the finishing corrosion of polishing surfaces. Also, the present invention may include means for injecting $O_2$, $CO_2$, $N_2$, into slurry. Custom formulating slurries can help ensure that the present invention tailors the polishing to particular substrates.

To further adapt the polishing process to the substrate and the material, the present invention may also include a monitor for continuously monitoring residual metal. Along these lines, the present invention can include an adaptive feedback loop for varying pressure, slurry type, temperature, slurry quench, as well as other characteristics of the polishing process. This helps to make the present invention a dynamic polisher.

Also, the present invention can eliminate residual metal at a wafer edge. Along these lines, the present invention may also include a wafer edge deplater to remove deposits in the vicinity of the edges of a wafer.

The present invention may also be utilized for dynamic copper surface passivation. For this purpose, $CO_2$, $N_2$, $(NH_4)_2$, $CO_2$, among other materials may be utilized.

The present invention may also help to eliminate dishing and large features. The present invention accomplishes this through the multiple heads, variable pressure, and other aspects of the invention discussed herein that can tailor the polishing process.

Embodiments of the present invention, discussed below in greater detail, can provide, among other features fast wafer preplanarization thickness and uniformity profiling or mapping to determine optimum processing steps. The present invention may also cooperatively and dynamically detect polishing end points. The present invention can include a separate electroetching head with segmented cathodes for accelerated metal removal. The present invention can also include a fast planarized metal surface comparator mapping station with a dynamic feedback loop. The present invention can also include a yield recovery loop to remove materials from slurries and electroetching solutions.

Utilizing the above and other attributes, the present invention can tailor the polishing process to the thickness and uniformity of material on a wafer to minimize planarization time and optimize yield. The present invention may include one or a plurality of chambers for carrying one or more of the above steps. For example, certain aspects of characterization of the material in polishing may take place in one chamber and certain aspects of the characterization of the material being removed and being polishing may take place in the other chamber or chambers. The present invention can also include a single processing chamber or cell that includes means for varying the polishing process.

Figure 5:
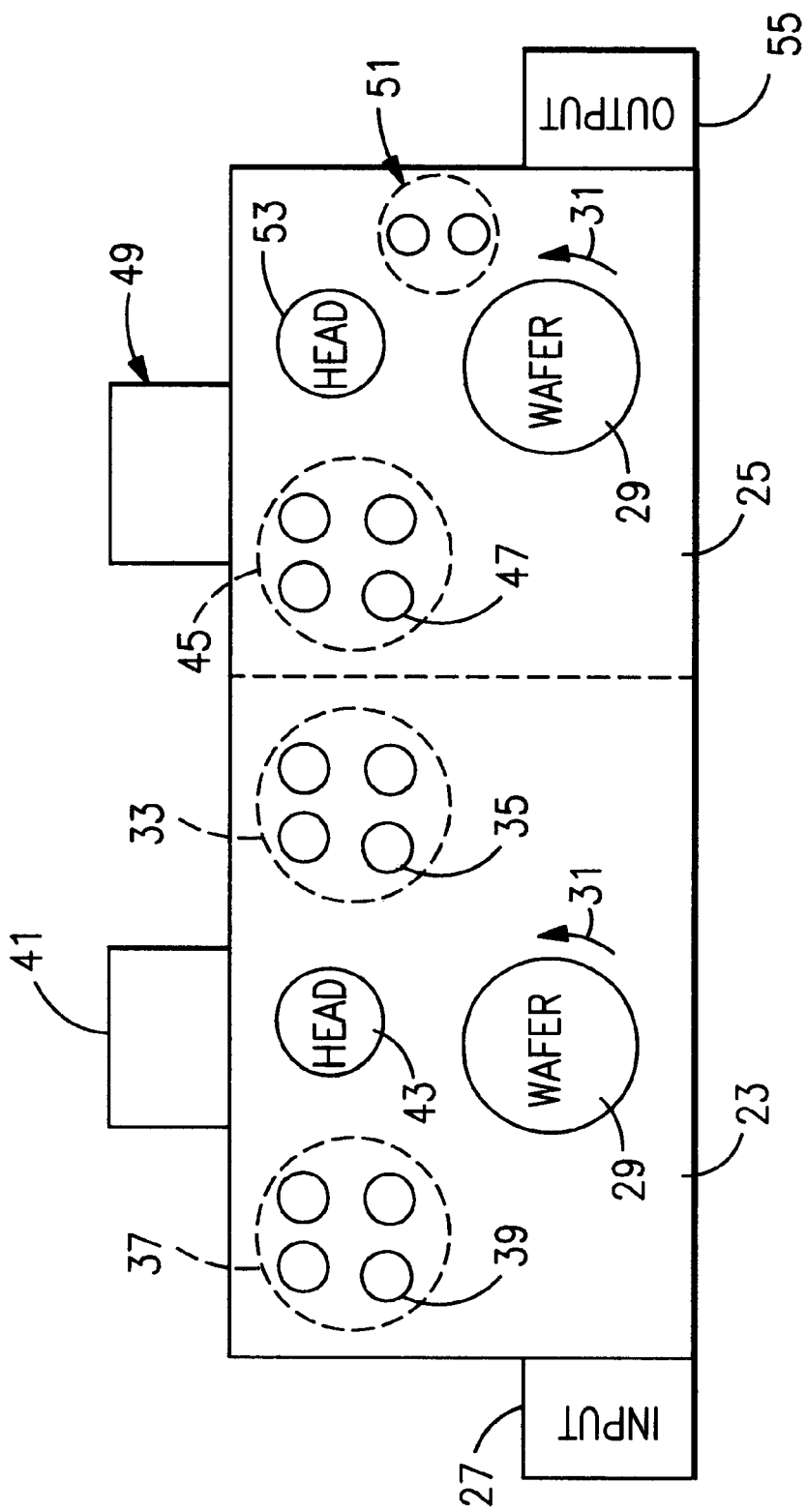
FIG. 5 illustrates an embodiment of a chemical mechanical polishing apparatus according to the present invention.

FIG. 5 illustrates an embodiment of an apparatus according to the present invention. The apparatus illustrated in FIG. 5 includes two processing chambers 23 and 25. Processing chamber 23 may include an input opening 27 for receiving substrates, such as semiconductor wafers, for processing in the chamber. Once received in chamber 23, a substrate 29 may be arranged on a substrate support illustrated in FIG. 6 and described below in greater detail. Typically, according to the present invention, a wafer being processed faces up as opposed to facing down such as in the apparatuses illustrated in FIGS. 2–4. As represented by arrow 31, a substrate 29 in the processing chamber may rotate.

Upon entering a chamber, material on a substrate may be characterized. Along these lines, the present invention may include etching and profiling elements in processing head 33. Processing head 33 may include a plurality of tools 35 for removing material from a substrate as well as characterizing the material from the substrate. The head 33 may be arranged over the substrate 29 to be polished in order to sense and process the substrate.

Along these lines, head 33 may be arranged at the end of apparatus for altering the position of the head 33. So that it may move from the position illustrated in FIG. 5 to a position over the substrate 29. According to some embodiments, head 33 as well as other heads including other polishing and sensing apparatuses may be arranged on a single support that may alter their position so that they may alternately be positioned over or remotely from the substrate 29 in the position illustrated in FIG. 5. According to another embodiment, a single apparatus may alternately engage and alter the position of the various sensing and processing heads but only be engaged to one sensing and/or processing head at a time, returning each processing and/or sensing head to its original position after sensing and/or processing a substrate.

Processing chamber 23 may also include a polishing tool head 37. Head 37 may include a plurality of polishing pads 39. The head 37 may be a rotating turret as described below. The head 37 may be arranged over the substrate to act on the substrate, such as to polish the substrate. According to one embodiment, one of the pads could be lowered to a lower level than the others. The turret could then be arranged over the substrate and the lowered pad could act on the substrate.

Polishing slurries may be formulated in a dynamic slurry formulator 41. The slurries may be fed to polishing head 43 which may alternately also be arranged over the substrate 29.

In the apparatus such as that illustrated in FIG. 5, processing chamber 23 may be characterized as a planarization chamber. In this chamber, an uneven surface of material on a substrate 29 may be planarized. According to such a process, the material, including its thickness and uniformity may be detected by, for example, head 33. Along these lines, head 33 may include one or more sensors. Such sensors can include non-contact eddy current based sensors known in the art.

After detecting the material, the material may be removed utilizing various chemical mechanical polishing and electroetching elements of the processing heads 33, 39, and 43 illustrated in chamber 23 of the apparatus shown in FIG. 5. Along these lines, to accomplish the polishing, various slurries may be formulated and utilized in the polishing process.

After being processed in chamber 23, a substrate 29 may be moved to chamber 25. When arranged in chamber 25, substrate 29 may also rotate as illustrated again by arrow 31. Processing chamber 25 may include a processing head 45. Processing head 45 may include one or more brush tools 47. The embodiment illustrated in FIG. 5 includes four brush tools on processing head 45. The brush tools may be utilized to help remove material from the substrate 29. Brush tools may provide a finer polishing dynamic chemical mechanical polishing tool.

Processing chamber 25 may also include a particle cleaning and surface passivation system 49 for helping to remove particles from the surface of substrate 29 as well as passivating the surface of substrate 29. Particle cleaning and surface passivation may take place after or before utilization of brush tools 47.

At least one surface comparator 51 may be included in processing chamber 25 for scanning the surface of substrate 29 before, during and after processing of the substrate to help determine the condition of the surface and whether the surface requires further processing. Such comparators are known in the art and one of ordinary skill in the art could determine an appropriate device to utilize in this context. One or more of the surface comparators could be arranged over a substrate being processed to sense the substrate.

Processing chamber 25 may include processing head 53. In the present invention, the head 53 may include additional processing tools. Typically, head 53 is a polishing head such as that illustrated in FIGS. 6a and 6b and described in greater detail below.

After processing in chamber 25, wafers may exit the system through output 55.

FIG. 6 represents a cross-sectional view of a processing head that may be included in one of the processing chambers 20–25 shown in FIG. 5.

Figure 6A:
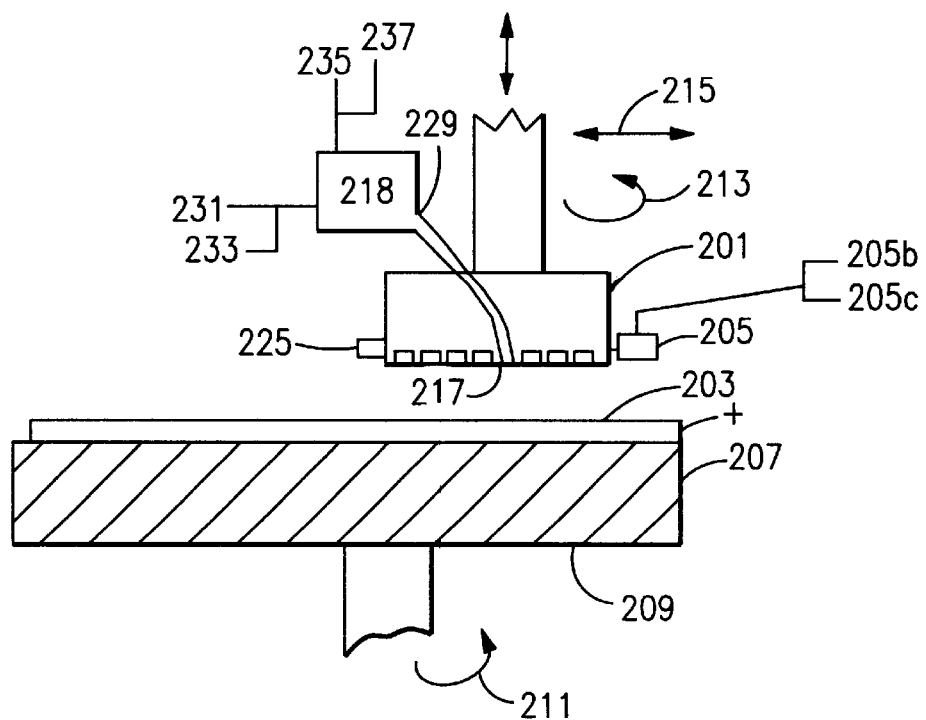
FIG. 6a represents a cross-sectional view of a portion of the apparatus illustrated in FIG. 5 for carrying out at least chemical mechanical polishing and electroetching of a substrate.

FIG. 6a represents a cross-sectional view of an embodiment of an apparatus according to the present invention.

FIG. 6a illustrates an embodiment of a device according to the present invention. The embodiment illustrated in FIG.

6a may be utilized for carrying out both chemical mechanical polishing and electroetching of a substrate. Along these lines, the embodiment illustrated in FIG. 6a includes a polishing head 201 for carrying chemical mechanical polishing on a substrate 203. The polishing head may include a pad region illustrated in FIG. 6b and discussed below in greater detail.

The apparatus illustrated in FIG. 6a also includes an anode 203 and cathode 205 for electroetching material from the substrate. The cathode 205 may be arranged adjacent the polishing head while the anode 207 typically the workpiece, may be provided in contact with the rotating platen 209. Or the substrate may simply form the cathode. The present invention may include a power supply for supplying power to the anode or workpiece and the cathode.

The substrate 203 or the anode may be supported on substrate support 209. The workpiece 203 may be energized to serve as an anode. To enhance the evenness and speed of the chemical mechanical polishing and other processes, the substrate support 209 may rotate as indicated by arrow 211.

As stated above, the present invention may also include elements for carrying out chemical mechanical polishing. These elements can include a polishing head. FIG. 6a illustrates an embodiment of a polishing head 201. As indicated by arrows 213 and 215, the polishing head may be rotated as well as having its position altered in a lateral direction. Also, position of the head may be vertically altered, to move away from the substrate or downward to increase polishing pressure on the workpiece.

While the polishing head and/or the substrate support may both rotate, it is not necessary that either rotate. Also, while the substrate support rotates, the head 201 may transverse laterally as during etching operations. Lateral movement of the head may also take place without the substrate rotating.

Polishing slurry may be introduced between the polishing head and the substrate to be polished through at least one slurry introduction orifice or port 217 provided on the polishing head. The at least one slurry port 217 may be connected to a supply of polishing slurry 218 as discussed in greater detail below.

Figure 6B:
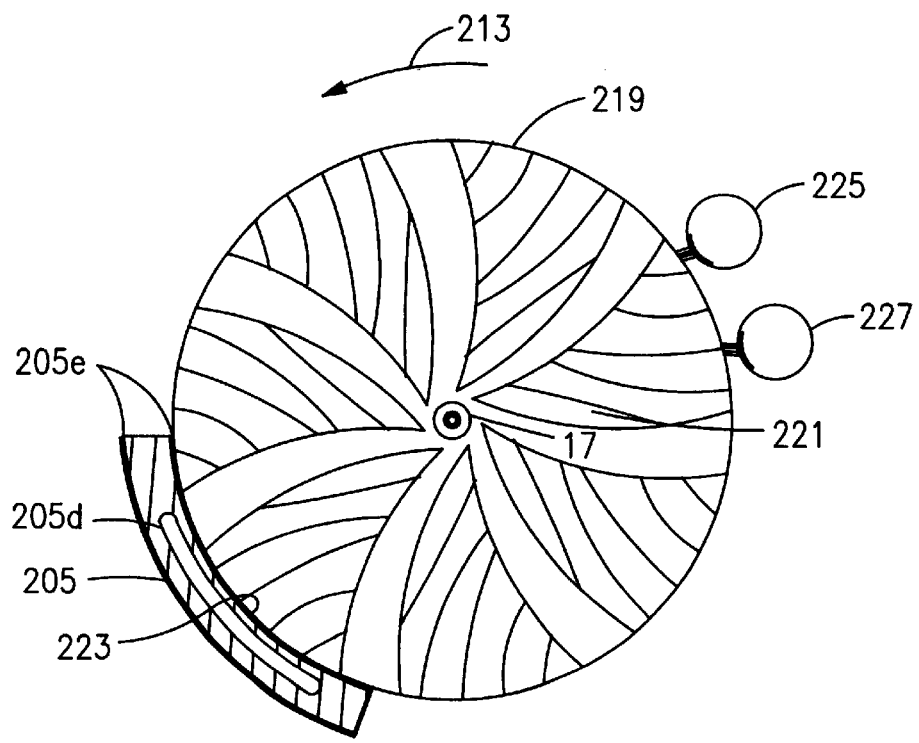
Figure 6C:
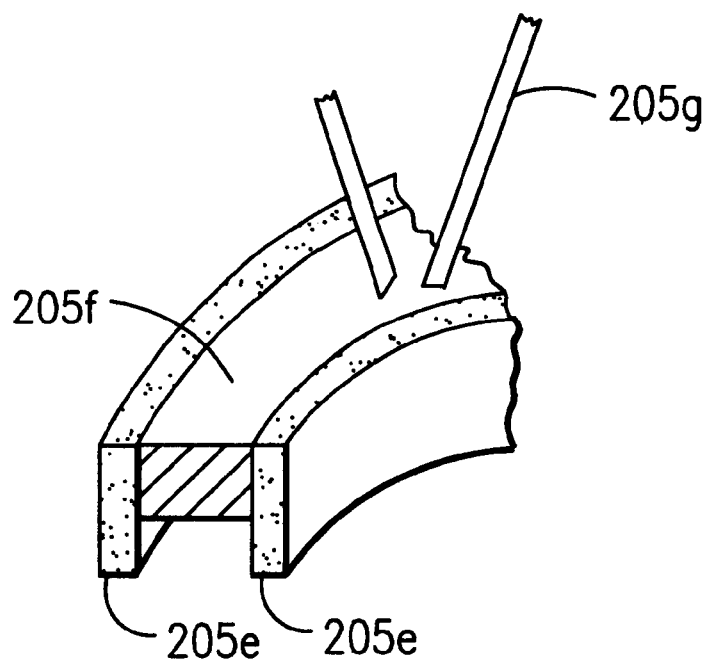
FIG. 6c represents a perspective and cross-sectional view of a portion of an embodiment of a cathode assembly that may be included in the apparatus illustrated in FIGS. 6a and 6b.

FIG. 6b illustrates a front view of the polishing head illustrated in cross-sectional view in FIG. 6a. The embodiment of the polishing head illustrated in FIG. 6b includes a pad region 219. The pad region includes surfaces that will actually engage the surface of the substrate being polished.

To enhance distribution of slurry throughout the region between the polishing head and the substrate, the polishing head may include at least one slurry distribution gap or runner 221. The embodiment illustrated in FIG. 6b includes a plurality of slurry distribution gaps or channels.

To enhance the distribution of slurry further, the slurry distribution gap(s) may have a shape to encourage the slurry(ies) to be distributed throughout the space between the polishing head and the substrate. The embodiment of the slurry distribution gap illustrated in FIG. 6b includes a curved shape that radiates in a curve away from a central region of the polishing head. FIG. 6b also illustrates the slurry introduction port 217.

FIG. 6b also illustrates the cathode 205 illustrated in cross-section in FIG. 6a. As illustrated in FIGS. 6a and 6b, the cathode may be arranged in the vicinity of and/or adjacent the polishing head 201. As illustrated in FIGS. 6a and 6b, the cathode may be arranged adjacent a side wall of the polishing head.

As illustrated in FIG. 6b, the cathode 205 may include a surface 223 having a shape complimentary to the contour of the shape of the side wall of the polishing head 201. Including a cathode having a complimentary shape to the exterior surface of the side wall of the polishing head can help to increase the surface area contact between the cathode and the polishing head where the cathode contacts the polishing head. As illustrated in FIG. 6b, the entire cathode 205 may have a shape complimentary to the shape of the side wall of the polishing head 201.

Also, the cathode may be removable. Whether removable or not, the cathode may be located about 2 to 3 mm from the walls of the polishing head. An easily detachable cathode may be fabricated from stainless steel or titanium or other suitable materials. As seen in FIG. 6b, the cathode may include inlets 205b and 205c for at least one etching or polishing solution. The cathode may also include channel 205d for outlet or discharge of the etching or electropolishing solution on the workpiece 203.

For electrolyte etching or polishing operations, the electrolyte or electrolytes may be pumped through the inlets 205b and 205c, shown in FIG. 6a, of the cathode at a flow rate of about 0.5 liters per minute to about 10 liters per minute. As the electrolyte(s) flow(s), the cathode material 205f, illustrated in FIG. 6b, may be rendered cathodic, with voltage that may range between about 1 volt and about 10 volts. Along these lines, the cathode assembly may include an electrical connection 205g to a power supply.

The cathode assembly may include a dam wall 205e, shown in FIG. 6b. The dam wall may help maintain a liquid gap of about 1 mm to about 5 mm between the cathode material 205f and the workpiece 203. Also, the dam wall may be fabricated from an insulating material. One example of an insulating material that may be utilized in the dam wall 205e is high density polypropylene. Of course, any suitable insulating material may be utilized in the dam wall.

The dam wall 205e may also act as a wave guide. As such, the dam wall 205e may direct the electric field to the workpiece. The dam wall 205e may also shield the workpiece region not immediately below the cathode material 205f from dissolution.

During the electroetching or polishing step, the substrate holder 209 may rotate the workpiece 203 at a rate of about 205 revolutions per minute to about 50 revolutions per minute. Also during the electroetching or polishing step, the head 201 may move laterally across the workpiece at a speed that may range between about 0.3 centimeters per second to about 3 centimeters per second.

The present invention may include a sensor 225 for measuring the amount of material removed or left on the workpiece by the scanning cathode 205, as the cathode travels across the workpiece. The rate of material removal from the workpiece may range from about 0.05 microns per second to about 1.5 microns per second.

After the material removal operation, the workpiece may momentarily rinsed with deionized water (DI). The DI may be pumped through inlet 205c of the cathode assembly. The time for this brief rinse cycle may range between about 2 seconds to about 5 seconds. During the rinse, the substrate may be rotated at a rate of about 60 rpm to about 300 rpm. During the rinse cycle, the head 201 may retract upwards away from the workpiece about 2 cm to about 5 cm.

After the rinse step, if included, the chemical mechanical planarization (CMP) of the remain metal on the workpiece 203 may be initiated. If no rinse is carried out, the CMP may be carried out after the electroetch.

Also arranged adjacent to the polishing head 201 may be at least one sensor 225. The sensor(s) may vary, depending upon the processes carried out. For processing metals, an eddy current probe may be used to measure the amount of metal left on the workpiece. For insulator polishing, an ellipsometric sensor may be used to measure the amount of insulator left on the workpiece.

Another example of a sensor utilizes a UV visible fiber optic array to detect the presence of certain reaction compounds or by products. By detecting these materials, the sensor may detect end points during CMP operations. A UV sensor may be utilized in a reflector mode to detect various materials since UV light typically is reflected differently by different materials, and particularly different metals.

Further arranged adjacent to the polishing head may be at least one second sensor 227 to detect a polishing end point. For example, the end point detector could be an electrochemical sensor calibrated to detect the transition of one type of material to another. For example, the at least one sensor could include a pH sensor. Such a sensor could detect changing conditions as a change occurs from one chemical reaction to another.

Typically, sensor 225 and 227 operate in a collaborative manner. For instance, sensor 225 may initially quickly measure the thickness and profile of material such as metal deposited on the workpiece. From this information, the sensor may select the optimum recipe of electropolishing and/or CMP processes required.

After electropolishing and/or CMP processes are initiated, toward a later part of the CMP process, sensor 225 may activate sensor 227. With both sensors activated, they may both work in a collaborative manner. For example, in the polishing of copper films with a tantalum barrier layer in a damascene type structure, sensor 225 may control the initial portions of Cu electroetching and CMP overburden removal. As the amount of metal left, for example, is reduced to about 50 nm to about 100 nm, sensor 227 may be activated. A higher sensitivity of sensor 227 may enhance endpoint detection, on the titanium barrier layer, while sensor 225 may measure the thickness of the barrier material needed to be removed.

Sensor 225 may initiate an appropriate choice of recipe for barrier removal and may activate flow of barrier slurry through inlet 205*c*. On the other hand, sensor 227 may determine titanium barrier endpoint and may initiate a rinse recipe. The rinse could be initiated to clean off all slurry from the workpiece. The rinse could be pumped through chamber 218. The workpiece may then be spun dry and unloaded.

As stated above, at least one slurry may be introduced through at least one slurry port 217. The slurry(ies) may be contained in at least one slurry reservoir 218 or be fed into slurry reservoir from slurry sources. The slurry reservoir 218 may be connected to slurry port 217 through slurry conduit 229. The embodiment illustrated in FIG. 6*a* includes two slurry sources 231 and 233 for introducing two different slurries into slurry reservoir 218.

To enhance the action of the slurries in the chemical mechanical polishing, nitrogen and/or oxygen, ammonia or $CO_2$ may be introduced into the slurry(ies). Oxygen and nitrogen may effect the polishing rate as well as the degree of smoothness of the polishing. The nitrogen and/or oxygen may be introduced into the slurry(ies) at any point prior to introduction of the slurry(ies) into slurry reservoir 219 or introduction into the space between the polishing head and the substrate.

Accordingly, the present invention may include a source of nitrogen 235 and a source of oxygen 237. The nitrogen may be in the form of $N_2$, while the oxygen may be in the form of $O_2$. The oxygen may also be introduced in the form of inorganic or organic peroxides or iodates. Any source of nitrogen or oxygen may be utilized, including any nitrogen or oxygen containing compound.

For example, to generate a move aggressive slurry, oxygen may be introduced into chamber 218. The oxygen flow rate may range from about 5 sccm/L of slurry to about 100 sccm/L of slurry in the slurry mix chamber 218.

For some metals, the metal removed rate may be higher when the metal is oxidized. For example, nitric acid could be utilized to oxidize the metal. The introduction of higher concentration of oxygen into the slurry may enhance metal removed rate. However, this enhanced removed rate, while highly beneficial when there is large metal overburden, could produce disastrous results with respect to metal removal endpoint. This is because the material insides the trenches and vias may be removed where such removal is not desired.

Prior to the endpoint of metal removal, $N_2$ may be sequentially introduced into the slurry to displace the more aggressive oxygen introduced earlier in the process. The presence of $N_2$ in the slurry may reduce the aggressiveness of the slurry and help produced a highly smooth and reflective finish on the end product. The flow rate of $N_2$ may range between about 10 sccm/L of slurry to about 500 sccm/L of slurry in chamber 218.

Also, chamber 218 may be equipped with flow control values to control slurry delivery through channel 217. Additionally, chamber 218 may include a coarse filter for filtering particles having dimensions of about 1 to about 30 microns to remove undesirable particles from the slurry.

In some slurry systems, sensor 227 may detect pH changes. The pH may change during the CMP process. The pH change typically is due to by-products of the reactions taking place. The change in pH may degrade the polishing rate and the nature of the finish on the end product. For such systems, the introduction of $CO_2$ or $NH_3$ gas may be used to control the pH in situ on the polishing pad. The flow rate of $CO_2$ may range between about 3 sccm/L of slurry to about 20 sccm/L of slurry.

The judicious combination of $O_2$, $N_2$, $CO_2$, $NH_3$ and/or other gases may be used to enhance the polishing of Cu, Al, W, Ta, Ti, TiN, Cr, Au, Ag, Ni, $SiO_2$, SiN, $SiO_xN_y$, amorphous metal, ferromagnetic films, such as parmalloy, high dielectric constant materials, such as with a dielectric constant greater than about 9, and lower dielectric constant materials, such as with dielectric constant lower than about 3 to about 5.

The slurries may be formulated to carry out the CMP at various rates. The in situ slurry formulation could be carried out to process at a slow rate, medium rate, and fast rate, sequentially or in any desirable combination.

The present invention may utilize a dynamic loop for controlling formulation of the slurry(ies) and control of the polishing process. The dynamic control loop is an alternative to manually controlling the polishing slurry formulation and polishing process. The various sensors described herein may be utilized to sense slurry conditions as well as condition of the substrate and stage of material removal. The sensors may act cooperatively to control the process. The sensors may also act adaptively, for control of the process without an operator. The control loop and utilization of the sensors may apply to the electroetching process as well.

In addition, the chamber 218 may contains heating elements to help maintain the formulation slurry at optimum temperature to prevent particulate agglomeration.

As stated above, the present invention also provides a method for removing material from a substrate. The method includes introducing a substrate into an apparatus such as that described above. Chemical mechanical polishing is performed on the substrate and electroetching is performed on the substrate without transferring the substrate to another apparatus.

One of shortcoming of traditional methods of polishing wafers is that the substrate faces down on a pad. Enhancing slurry transport to the substrate requires that the platen typically is several times larger than the substrate. The slurry is typically dispensed on the pad close to the substrate as the platen and/or the substrate rotates. Various complicated substrate motions, such as orbital or planetary motions, are often required to help ensure that fresh slurry reaches the center of the substrate.

According to the present invention, the slurry may be metered through the center of the polishing head. To further enhance fresh slurry distribution, the pads instead of being flat and continuous may be shaped and discontinuous. Fresh solution may be transferred to different regions of the pad through the gaps 221, or runners, separating the various pad elements 219.

The shaped runners may be designed for optimum slurry dispersal to various parts of the pad. For example, the runners 221 may be wider in the vicinity of the center of the pad and narrower in the vicinity of the periphery of the pad. The narrowest section may occur in the vicinity of the edge of the pad. This design may not only enhance slurry flow and dispersal throughout the head, but it may also maximize slurry retention times over the head. The latter aspect may reduce amount of slurry needed to polish a given substrate.

Figure 6D:
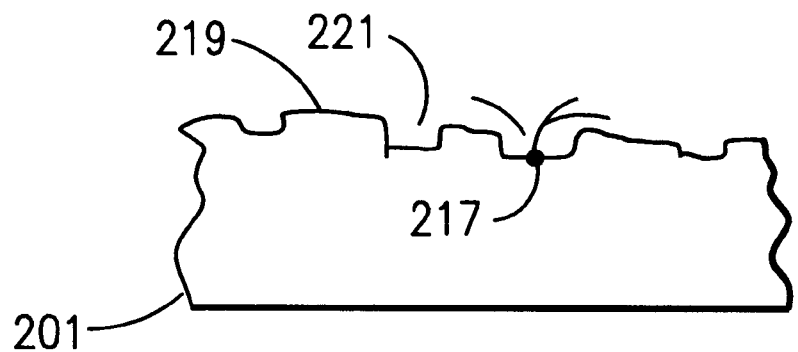
FIG. 6d represents a cross-sectional view of a portion of an embodiment of a polishing head according to the present invention that may be included in the apparatus illustrated in FIGS. 6a–6c.

FIG. 6d illustrates a cross-sectional view of a portion of the polishing head illustrated in FIG. 6a. As such, FIG. 6d illustrates pad region 219, slurry distribution gaps 221, and slurry orifice 217, all included on polishing head 201.

The second chamber 25 may carry out a rapid inspection of substrate 29. In processing chamber 25, a barrier utilized in plating some materials on semiconductor wafers may be removed.

For rework or yield enhancement or recovery, sites with residual metal may be fed to the main polisher. The wafer may be transferred back to processing chamber 23 or the residual metal may be removed in chamber 25. A small polishing head, such as head 53 may be utilized to remove metal residues locally. A small polishing head may have a diameter of about 5 mm.

The device described above and shown in FIGS. 6a–6d may be utilized in any embodiment of the present invention. A turret that includes a plurality of polishing pads or heads could include a plurality of the devices shown in FIGS. 6a–6d.

Figure 7:
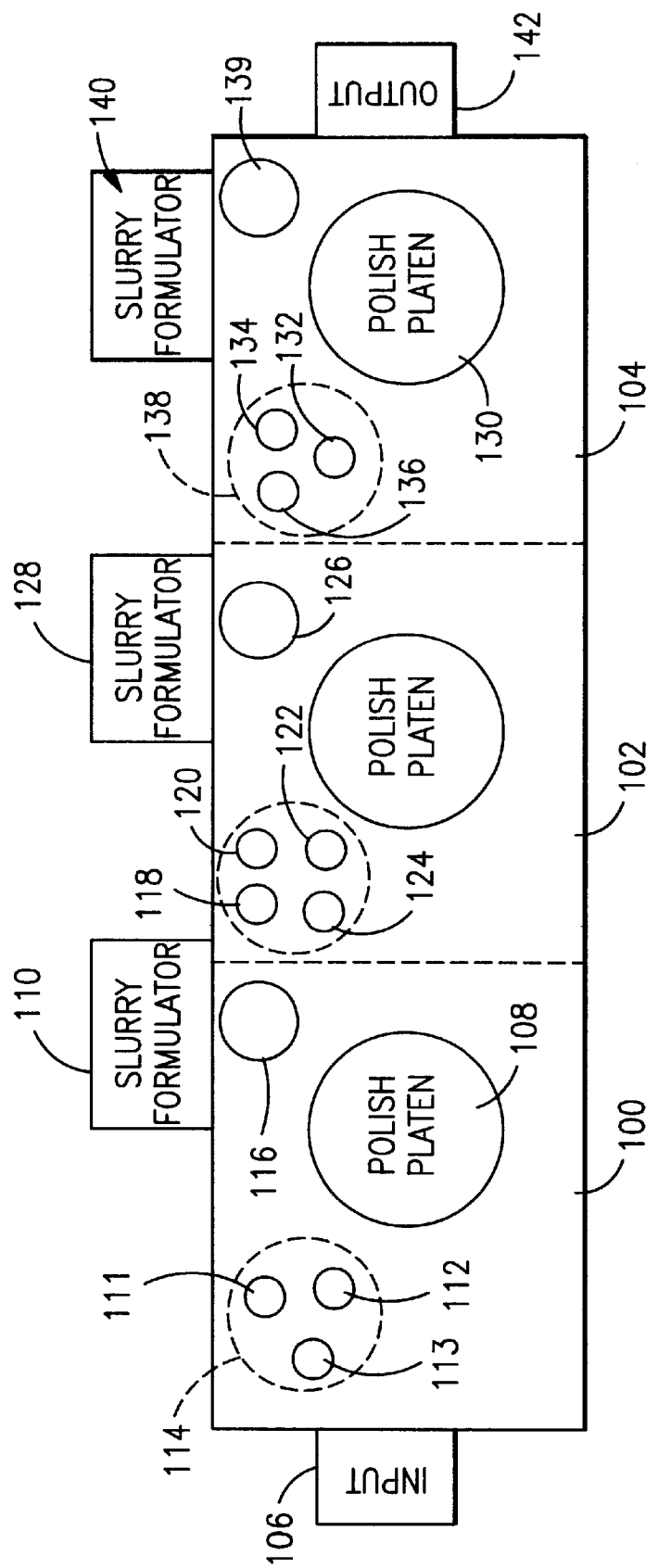
FIG. 7 represents another embodiment of an apparatus for chemical mechanical polishing and electro etching according to the present invention.

FIG. 7 illustrates another embodiment of a wafer processor according to the present invention. The apparatus illustrated in FIG. 7 includes three processing chambers 100, 102, and 104. The polishing process may be partitioned into various stages that may be carried in each of the polishing cells. For example, similar to the first polishing chamber in the apparatus illustrated in FIG. 5, the first processing chamber or cell 100 in the embodiment illustrated in FIG. 7 may characterize metal thickness and distribution on the substrate.

A substrate may be introduced into cell 100 through input portal 106. The substrate may be arranged on a platen 108. After introducing a substrate into processing cell 100 and characterizing the material on the substrate, a slurry may be formulated in slurry formulator 110 appropriate to the characteristics of a material on the substrate to be removed. Typically, this first polishing slurry is formulated to rapidly eliminate metal topography and thickness and then polish the wafer close to the barrier layer utilized in depositing the metals and semiconductor device manufacture.

The processing cell 100 may include a head 114 including a plurality of polishing tools 111, 112, and 113. The polishing tools may include chemical mechanical polishing pads. The polishing pads may have various characteristics for various degrees of polishing. For example, the polishing pads could have characteristics for aggressive material or removal, mild material, or any degree therebetween.

Processing head 114 may be a rotating turret 114. The tools that may be included in the first cell include three polishing tools 111, 112, and 113 on rotating turret 114. The tools can include a high speed electropolishing head, a high rate polishing head, and a variable pressure polishing head. In reality, any desired tools may be included on the turret.

In an important point here is that each polishing cell may include a plurality of tools, sensors, and other equipment to optimize the polishing process to tailor it to a specific substrate and material on a substrate. This is also the reason for including a slurry formulator to optimize slurry composition.

The first polishing cell 100 may include head 116. Head 116 may be similar to the head shown in FIGS. 6a and 6b as described above in greater detail.

Additional processing steps may be carried out in processing cell 100. For example, an intermediate slurry quench and rinse step may be carried out. This step may be brief.

After processing in cell 100, the material remaining on the substrate may again be detected. As the substrate is transferred from polishing cell 100 to polishing cell 102, the most recent data regarding the material in a substrate may be transferred to the second polishing cell. For example, the latest data regarding metal remaining on the substrate and/or uniformity of the metal remaining on the substrate may be transferred to the second processing cell.

Similar to the process carried out in the first processing cell, upon arrival of the substrate and data regarding the material in a substrate arrives in the second polishing cell, the optimum processing steps may be determined for treating the substrate. Along these lines, the second processing cell may determine which tool or tools to utilize to process the substrate. If chemical mechanical polishing is utilized, an optimal slurry recipe may be determined to complete the polishing process.

The second processing cell may include four polishing heads 118, 120, 122, and 124 arranged on a rotating turret. The tools can include high rate polishing head, an intermediate rate polishing head, a touch up finishing head, and small head polisher utilized for localized polishing to remove metal residues.

Processing head 126 may be included in cell 102. Processing head 126 may act as the other processing heads, such as that 116, as described above.

Depending on metal profile, during polishing, the pressure on the wafer can be distributed. Thus, the polishing pressure can be programmed to radially vary as the polishing head moves across the wafer. According to one embodiment, the pressure may be varied by differentially applying pressure to the backside of the wafer as the polishing head moves. By controlling where the pressure is applied to the wafer, where the wafer contacts the head, or contacts the head with greater force, may be controlled. Typically, such polishing includes a local polishing head that is smaller than the wafer.

After processing in the second polishing cell 102, the substrate may be moved to a third polishing cell 104. The third polishing cell may include a polishing platen 130 for supporting the substrate. Rather than including the polishing platen in each polishing cell, the polishing platen may travel between the cells. Along these lines, a device according to the present invention could include a plurality of polishing platen that may be introduced at one end of the apparatus and discharged from the apparatus at the other end.

The third cell may include a plurality of brush tools 132, 134, and 136 arranged on a turret 138. The brush tools may be utilized for slurry removal from the substrate. Polishing cell 104 may also include a particle cleaning passivation tool 140. To detect the end point of the cleaning, the third cell may include a scanning laser holography system to provide feed back to the cleaning tools.

Polishing cell 104 may include processing head 139. The processing head 139 may be similar to processing heads 116, as described above.

Cell 104 also may include an output 142 where substrates may be discharged after processing.

By including in situ dynamic slurry formulators in polishing cells of the present invention, slurries may be formulated as desired depending upon desired metal removal rates. New slurries may be formulated from a plurality of master batches. Typically, three master batches may be utilized in various combinations to formulate the slurries.

To further vary the slurry composition, slurry formulators may include additive meters for detecting properties of the slurries and varying them. Along these lines, the slurry formulators may include oxygen, nitrogen, and/or carbon dioxide injectors to supply these materials to the slurries to vary the slurry characteristics.

Characteristics of the slurries may be further varied by a slurry chiller and slurry heater to control slurry temperature. Along these lines, the present invention may include one or more slurry heaters to control slurry temperatures for optimum metal polish. The slurry heater may be an infrared heater. One or more slurry chillers may be included in the present invention for polish surface cleaning and passivation. The slurry chillers may utilize nitrogen and carbon dioxide injection.

Devices according to the present invention can include one or more processors for analyzing data regarding the characteristics of the material to be removed from the substrate and determining appropriate tools and/or slurry compositions to utilize for removing the material.

Apparatuses according to the present invention can also vary pressure on material being removed from the substrate during polishing of the material. The pressure may be varied radially as a polishing tool moves across the wafer. In addition to rotating the substrate and/or the polishing heads or other polishing apparatuses, the position of either one or both of these may be laterally altered. The polishing pressure may also be varied in any other directions in any manner that may be required or desired to remove the material from the substrate.

In addition to including a slurry formulator for formulating and introducing at least one slurry, the present invention may include means for directing deionized water at a substrate. The deionized water may be delivered through the same means as the slurries.

The at least one pattern comparer may compare a pattern of material on a substrate with a known pattern to determine how removal of the material should proceed.

Rather than including a plurality of polishing cells, all of the functions carried out in the various cells in the embodiments illustrated in FIG. 5 and FIG. 7 may be carried out in a single polishing cell. Along these lines, the present invention may include at least one polishing cell including a plurality of elements for varying polishing process parameters. The parameters may include polishing pressure, slurry composition, polishing pad type, etch current, as well as other parameters.

The present invention also includes a method of removing material from a substrate. The method includes arranging a substrate on an apparatus such as that described above, detecting material from the substrate forming a first polish operation and completing the polish operation. The method includes varying various parameters of the polishing operation, such as slurry composition, polishing pad pressure, polishing pad characteristics, electroetch current and/or any other process parameter. The present invention also includes detecting points where the polishing should be terminated such as detecting an end point of the polishing operation. Formulating the slurry may also include introducing at least one of oxygen, carbon dioxide, and nitrogen into the polishing slurry.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. An apparatus for removing material from a substrate, comprising:
    a plurality of polishing cells comprising:
    a first polishing cell for detecting the material on the substrate and performing a first polishing operation for removing material from the substrate, the first polishing cell comprising at least one sensor for characterizing the material on the substrate and at least one polishing tool for removing material from the substrate; and
    a second polishing cell comprising at least one polishing tool for completing the polishing process;
    wherein the first polishing cell further comprises a processor for determining composition of a first polishing slurry; and
    wherein the first polishing cell comprises three polishing tools mounted on a rotating turret.

2. The apparatus according to claim 1, wherein the polishing tools include a high speed electropolishing head, a high rate polishing head, and a variable pressure head.

3. An apparatus for removing material from a substrate, comprising:
    a plurality of polishing cells comprising:
    a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the material on the substrate to be removed is at least one metal or alloy and the first polishing cell polishes the at least one metal or alloy to within the vicinity of a barrier layer.

4. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the first polishing station comprises an electro-etching head comprising at least one segmented cathode.

5. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the at least one polishing tool of the first polishing cell comprises a plurality of polishing heads comprising a plurality of polishing pads.

6. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the first polishing cell further comprises means for introducing at least one of at least one polishing slurry for polishing the substrate and deionized water; and wherein the first polishing cell further comprises at least one injector for introducing at least one of oxygen, carbon dioxide, and nitrogen into the at least one polishing slurry.

7. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the second polishing cell further comprises at least one pattern comparer for comparing a pattern of the material exposed by the polishing with a known pattern.

8. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

further comprising a recovery loop for recovering material removed from the substrate.

9. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the second polishing cell further comprises a mapping inspection station including a dynamic feedback loop.

10. The apparatus according to claim 9, wherein the inspection station comprises a diode array for scanning a surface of the substrate recording coordinates on the substrate of locations with metal residues.

11. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the second polishing cell further comprises at least one brush tool.

12. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein the second polishing cell further comprises at least one polishing head comprising at least one polishing pad for locally removing material from the substrate; and wherein the second polishing cell comprises a turret and four polishing heads arranged on the turret, the four polishing heads including a high rate polishing head, an intermediate rate polishing head, a touch up finishing head and a polishing head sufficiently small to permit localized polishing of the substrate.

13. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

and said apparatus further comprising:

an in situ slurry formulator for formulating slurries based upon material removal rates.

14. The apparatus according to claim 13, wherein the slurries are formulated from three master batches.

15. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

and said apparatus further comprising a slurry heater for controlling temperature of polishing slurries for optimally polishing the substrate.

16. The apparatus according to claim 15, wherein the heater is an infrared heater.

17. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

and said apparatus further comprising a slurry chiller for controlling temperature of polishing slurries for polishing the substrate.

18. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

and said apparatus further comprising a slurry chiller for controlling temperature of polishing slurries for polishing surface cleaning and passivation of the substrate;

wherein the first polishing cell further comprises means for introducing at least one of at least one polishing slurry for polishing the substrate and deionized water; and wherein the first polishing cell further comprises at least one injector for introducing at least one of oxygen, carbon dioxide, and nitrogen into the at least one polishing slurry.

19. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate;

a second polishing cell comprising at least one polishing tool for completing the polishing process; and a third polishing cell comprising at least one cleaner for cleaning the substrate;

wherein the third polishing cell carries out at least one of slurry removal and metal passivation treatment.

20. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate;

a second polishing cell comprising at least one polishing tool for completing the polishing process; and a third polishing cell comprising at least one cleaner for cleaning the substrate; and wherein the third polishing cell further comprises a scanning laser holography tool for detecting an end point to the cleaning.

21. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate;

a second polishing cell comprising at least one polishing tool for completing the polishing process; and a third polishing cell comprising at least one cleaner for cleaning the substrate; and wherein the third polishing cell comprises three brush cleaners.

22. An apparatus for removing material from a substrate, comprising:

a plurality of polishing cells comprising:

a first polishing cell for detecting the material on the substrate and performing a first polishing operation for removing material from the substrate, the first polishing cell comprising at least one sensor for characterizing the material on the substrate and at least one polishing tool for removing material from the substrate; and a second polishing cell comprising at least one polishing tool for completing the polishing process;

wherein at least one of the polishing cells comprises a polishing head that includes at least one edge electroetching element for electroetching an edge portion of the substrate.

23. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation; and completing the polishing operation;

wherein the first polishing cell is carried out with at least one of three polishing tools mounted on a rotating turret in the first polishing cell, the three polishing tools including a high speed electropolishing head, a high rate polishing head, and a variable pressure head.

24. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation; and completing the polishing operation;

wherein the material on the substrate to be removed comprises at least one metal or alloy and the first polishing operation polishes the at least one metal or alloy to within the vicinity of a barrier layer.

25. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation;

determining a composition of the at least one polishing slurry for removing the material from the substrate; and introducing at least one of oxygen, carbon dioxide, and nitrogen into the at least one polishing slurry.

26. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and comparing a pattern of the material exposed by the polishing to a known pattern with at least one pattern comparer included in the second polishing.

27. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and recovering material removed from the substrate with a recovery loop.

28. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and inspecting the material and the substrate with a mapping inspection station including a dynamic feedback loop included in the second polishing cell.

29. The method according to claim 28, wherein inspecting the substrate and the material includes scanning a surface of the substrate with a diode array included in the inspection station and recording coordinates on the substrate of locations with metal residues.

30. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and locally removing material from the substrate with at least one polishing head comprising at least one polishing pad included in the second polishing cell;

wherein completion of the polishing operation is carried out with second polishing cell comprising a turret and four polishing heads arranged on the turret, the four polishing heads including a high rate polishing head, an intermediate rate polishing head, a touch up finishing head and a polishing head sufficiently small to permit localized polishing of the substrate.

31. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and formulating slurries in situ based upon material removal rates.

32. The method according to claim 31, wherein the slurries are formulated from three master batches.

33. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and heating the at least one polishing slurry with a slurry heater for controlling temperature of the at least one polishing slurry for optimally polishing the substrate.

34. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and controlling temperature of the at least one polishing slurry with a slurry chiller.

35. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation;

wherein the apparatus further comprises a third polishing cell comprising at least one cleaner for cleaning the substrate; and carrying out at least one of slurry removal and metal passivation treatment with the third polishing cell.

36. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing operation;

detecting the material on the substrate;

performing a first polishing operation;

completing the polishing operation;

wherein the apparatus further comprises a third polishing cell comprising at least one cleaner for cleaning the substrate; and detecting an end point to the cleaning with a scanning laser holography tool included in the third polishing cell.

37. A method of removing material from a substrate, comprising:

arranging the substrate on an apparatus comprising a plurality of polishing cells including a first polishing cell for detecting the material on the substrate and performing a first polishing operation for removing material from the substrate, the first polishing cell comprising at least one sensor for characterizing the material on the substrate, and at least one polishing tool and at least one polishing slurry for removing material from the substrate and a second polishing cell comprising at least one polishing tool for completing the polishing process;

detecting the material on the substrate;

performing a first polishing operation;

completing the polishing operation; and electroetching an edge portion of the substrate with a polishing head that includes at least one edge electroetching element included in at least one of the polishing cells.

* * * * *